United States Patent [19]

Jundt et al.

[11] Patent Number: 4,559,483

[45] Date of Patent: Dec. 17, 1985

[54] CONTROL DEVICE FOR INCREASING SPEED OF ACTUATION OF AN ELECTROMAGNETIC CONSUMER, PARTICULARLY IN AN INTERNAL COMBUSTION ENGINE

[75] Inventors: Werner Jundt, Ludwigsburg; Wolfgang Kosak, Möglingen; Peter Werner, Wiernsheim, all of Fed. Rep. of Germany

[73] Assignee: Robert Bosch GmbH, Stuttgart, Fed. Rep. of Germany

[21] Appl. No.: 623,488

[22] Filed: Jun. 22, 1984

[30] Foreign Application Priority Data

Jul. 29, 1983 [DE] Fed. Rep. of Germany ....... 3327393

[51] Int. Cl.⁴ .......................... H02P 1/22; H02M 3/06

[52] U.S. Cl. .................................... 318/301; 318/280; 363/59; 363/60; 363/61; 307/110

[58] Field of Search .................... 320/1; 361/155, 156; 307/110; 363/59, 60, 61; 318/301, 280

[56] References Cited

U.S. PATENT DOCUMENTS

| | | | |
|---|---|---|---|
| 3,147,423 | 9/1964 | Du Rocher | 318/280 |
| 3,240,958 | 3/1966 | Kerios et al. | 307/110 |
| 3,631,259 | 12/1971 | Kiyota | 307/110 |
| 3,778,697 | 12/1973 | Link et al. | 361/156 X |
| 3,821,627 | 6/1974 | Milorancevic | 307/110 X |
| 3,997,832 | 12/1976 | Tanaka et al. | 363/60 |
| 4,134,051 | 1/1979 | Pelchat et al. | 318/282 |
| 4,186,436 | 1/1980 | Ishiwatari | 363/60 |
| 4,302,804 | 11/1981 | Bader | 363/60 |
| 4,337,423 | 6/1982 | Giordano | 318/280 |
| 4,383,294 | 5/1983 | Van Sloun | 363/60 |
| 4,404,624 | 9/1983 | Yamazaki | 363/59 |

FOREIGN PATENT DOCUMENTS 2620181 11/1977 Fed. Rep. of Germany .

OTHER PUBLICATIONS

GE SCR Manual, 4th ed. 1967.

*Primary Examiner*—William M. Shoop, Jr.
*Assistant Examiner*—Shik Luen Paul Ip
*Attorney, Agent, or Firm*—Michael J. Striker

[57] ABSTRACT

The actuation speed of an electromagnetic consumer is increased by means of a charged capacitor which is connected in series with a consumer at such a polarity that its voltage is added to that of the power source. In one embodiment, the capacitor is switched across the power source until it is charged and then it is connected in series with the consumer at such a polarity that its positive pole is grounded while the negative pole is connected to the consumer. In another embodiment, the capacitor is first charged through the electromagnetic consumer and then it is connected with its positive pole to ground and with its negative pole to the consumer.

5 Claims, 2 Drawing Figures

CONTROL DEVICE FOR INCREASING SPEED OF ACTUATION OF AN ELECTROMAGNETIC CONSUMER, PARTICULARLY IN AN INTERNAL COMBUSTION ENGINE

BACKGROUND OF THE INVENTION

The invention relates in general to a control device for electromagnetic consumers, particularly in internal combustion engines, and in particular to a device for increasing speed of actuation of such consumers by applying thereto an increased voltage by means of a capacitor.

In the German DE-OS No. 2,620,181 a circuit is described in which by means of a capacitor an increased voltage is applied to an electromagnetic consumer. This voltage increase causes a faster actuation of the consumer. In this known circuit however the capacitor is charged through the consumer and therefore it is not possible to completely disconnect the latter so that zero current through the consumer be achieved.

SUMMARY OF THE INVENTION

It is therefore a general object of this invention to overcome the aforementioned disadvantage.

More particularly, it is an object of the invention to increase the starting voltage across the electromagnetic consumer by means of a capacitor and a switching device so that the starting process of the consumer be accelerated and at the same time reserving the possibility to reduce current flowing through the consumer to zero in order to completely disconnect or inactivate the consumer.

Another object of this invention is to provide a control device of this kind which is constructed of a small number of component parts, is simple in structure and effectively shortens the switch-on time of the electromagnetic consumer.

In keeping with these objects and with others which will become apparent hereafter one feature of the invention resides, in a control device of the beforedescribed type, in the provision of a multiposition switch-over device which in one switching position thereof connects the capacitor across the terminals of a direct current power source to charge the capacitor to the power source voltage and, in another switching position thereof, connecting the charged capacitor in series with the consumer and with the power source in such a manner that the connection point of the capacitor and the consumer is at a lower potential than the connection point of the capacitor with the power source.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
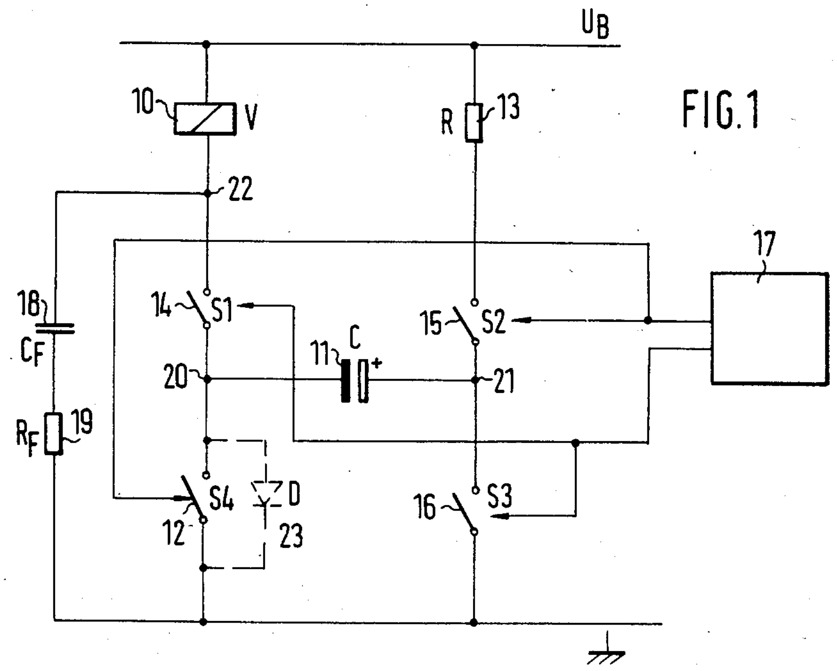
FIG. 1 is a schematic circuit diagram of one embodiment of the control circuit of this invention.

FIG. 1 shows a control device for achieving a faster switching-on of an electromagnetic consumer particularly for use in connection with an internal combustion engine.

The circuit includes an electromagnetic consumer 10, a capacitor 11, a switchover device including switching contacts 12 and 15 and 14 and 16, a switch control circuit 17 for controlling the switching positions of the switching contacts, a load resistor 13 and a series connection of a resistor 19 and a capacitor 18. The circuit also includes power source terminal $U_B$ and a ground terminal.

The connection of the entire control device resembles a bridge circuit connected between the terminal $U_B$ of a battery and the ground. One branch of the bridge includes the electromagnetic consumer 10 which is connected to the battery terminal $U_B$. The other connection of the consumer 10 is connected at junction point 22 to contact 14 of the switchover device and to the series connection of capacitor 18 and of resistor 19. Contact 14 is further connected at junction point 20 to one pole of capacitor 11 and to contact 12 of the switchover device. The other terminal of contact 12 is connected to mass or to ground terminal of the battery. The second branch of the bridge circuit includes the load resistor 13 which is connected to the positive terminal $U_B$ the battery and via a third contact 15 of the switchover device to a junction point 21 to which the other pole of capacitor 11 is also connected. A fourth contact 16 of the switchover device connects the junction point 21 to the mass or ground terminal or the battery. It will be seen that capacitor 11 bridges the junction points 20 and 21 between the four switchover contacts 12, and 14 through 16. The series connection of capacitor 1 and resistor 19 connects the junction point 22 to the ground terminal. The switch control 17 is mechanically coupled to respective switchover contacts 12 and 14 through 16 to control their switching positions.

According to this invention the switch control 17 controls the contacts in such a manner that in one switching position the contacts 12 and 15 are closed while the contacts 14 and 16 are open, or vice versa. In the first switching position, namely when contacts 15 and 12 are closed and contacts 14 and 16 are open, capacitor 11 is charged through full voltage of a direct current power source connected to the terminals $U_B$ and to the ground terminal. Accordingly, the junction point 21 has a positive potential and the junction point 20 has a negative potential. In the other switching position of the switchover device, namely when contacts 15 and 12 are open and contacts 14 and 16 are closed, the positive pole of capacitor 11 is connected to ground while the negative pole of the charge capacitor 11 is connected via junction point 20 and contact 14 in series with a consumer 10 to the positive terminal $U_B$ of the power source. Consequently, the charged capacitor 11 is connected in series with the power source at such a polarity that the voltage across the capacitor 11 is added to the voltage of the power source and this doubled voltage $2U_B$ is applied to the consumer 10. This increased voltage causes an increased current flow at the start of the consumer, thus speeding up its actuation. This increased voltage caused by the charge capacitor of course lasts only a limited time until the capacitor 11 is discharged and current at the junction point 20 drops to zero. This momentary voltage increase across the consumer 10 is sufficient to substantially increase the switch-on speed of the consumer. If the resistance of consumer 10 has a value V then the capacity C of capacitor 11 should be selected such that the time constant $V \times C$ be sufficiently large in order to achieve a significant improvement of the switching behavior of the electromagnetic consumer 10. As soon as a zero current condition occurs in the consumer 10 the switch control 17 reopens the contacts 14 and 16 and closes contacts 12 and 15 so that capacitor 11 is recharged to the full voltage of the battery power source and the switchover device is ready to speed up the actuation of the consumer. The series connection of capacitor 18 and resistor 19 from the junction point 22 to ground serves for overrunning the electromagnetic consumer 10 when the capacitor 11 is disconnected. After disconnection of the junction point 22 from capacitor 11, capacitor 18 is charged by current flowing through the consumer and after connecting the consumer in series with the capacitor and the power source, the capacitor 18 is again discharged. It is also possible to replace contact 12 by a diode 23 connected in its direction between the junction point 20 and the ground terminal. The diode 23 simplifies the construction of the switchover device by eliminating one contact. On the other hand, it prevents the capacitor 11 from being charged up to the full voltage of the power source $U_B$ and therefore the consumer 10 does not receive maximum available voltage increase.

Figure 2:
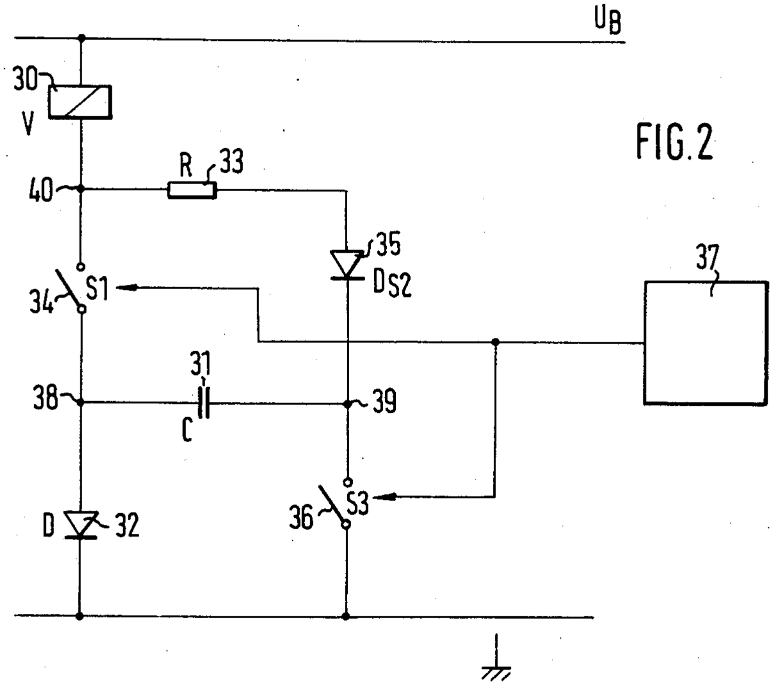
FIG. 2 is a schematic circuit diagram of another embodiment of this invention.

FIG. 2 shows a simplified version of the control device for speeding up the actuation of an electromagnetic consumer. In this embodiment, the series connection of a resistor R and a capacitor C (corresponding to the series-connection of resistance $R_F$ and $C_F$ in FIG. 1) serves simultaneously for speeding up the actuation of the consumer 30 by momentarily increasing its starting voltage. In this embodiment, the control circuit includes an electromagnetic consumer 30, a capacitor 31, a diode 32, a resistor 33, a switchover device 34 and 36, another diode 35 and a switchover control circuit 37.

The electromagnetic consumer 30 is again connected to the positive terminal $U_B$ of a power source and its other connection is connected at a junction point 40 to contact 34 of the switchover device and to the resistor 33. The other terminal of contact 34 is connected at junction point 38 to the anode of diode 32 whose cathode is connected to the ground terminal of the power source. Resistor 33 is connected to the anode of a diode 35 whose cathode is connected to junction point 39. The junction point 39 is connected to the ground terminal via the second contact 36 of the switchover device, and to one pole of capacitor 31 whose other pole is connected to the junction point 38.

The switchover control circuit 37 in this case either closes both contacts 34 and 36 or in another switching position simultaneously opens the two contacts. If the two contacts are open then a current path is established from the positive terminal $U_B$ of the power source via the consumer 30, the resistor 33, the diode 35, the capacitor 31 and the diode 32 to the ground terminal until the capacitor 31 is charged to the full voltage of the power source. As a result the junction point 39 is at a higher potential (positive) than the junction point 38 (negative potential). When the switchover control circuit 37 closes the two contacts 34 and 36, then the higher potential at the junction point 39 is connected to the ground terminal and the potential at the junction point 38 becomes negative relative to the ground terminal. As a result, the voltage across the capacitor 31 is added to the voltage of the power source and this doubled voltage is applied to the consumer 30. Due to this voltage increase an increased current starts flowing through the consumer 30 and causes a shorter switch-on time of the consumer. The capacitor 31 is thereby discharged and the potential and the junction point 38 is equalized to zero and consequently after a certain period of time only the power source voltage $U_B$ is applied to the consumer 30. When the contacts 34 and 36 are reopened, the charging process of capacitor 31 is initiated in the same manner as described before until the junction point 39 is again at a positive potential. The charging process of the capacitor 31 simultaneously brings about the free running of the consumer 30 that means during opened contacts 34 and 36 energy stored in the electromagnetic consumer 30 is charged in the capacitor 31.

In comparison with the embodiment of FIG. 1 where the capacitor 11 is always charged to the full potential of the power source $U_B$, the capacitor 31 in the embodiment of FIG. 2 is charged to a voltage which depends on current flowing through the electromagnetic consumer after its disconnection. In other words, the capacitor 31 in FIG. 2 is loaded via the consumer 30 to a lower voltage than in the embodiment of FIG. 1. On the other hand, the control circuit of FIG. 2 is simpler in construction for the price of lower voltage increase across the capacitor and therefore of a lower speed acceleration.

In this respect the embodiment according to FIG. 1 is superior because it guarantees a substantial improvement in the switching time of the consumer. Particularly, in the case of relatively low battery voltages, the embodiment of FIG. 1 can achieve such switchover speeds which in prior art devices of this kind would be achieved only with complicated control circuits having regulated switching end stages. The decision which of the two control devices of this invention is to be selected depends therefore strongly on the requirements for the switching time of a particular electromagnetic consumer.

In an internal combustion engine, the electromagnetic consumer is for example in the form of solenoid valves of a fuel metering system. The invention enables to substantially shorten the actuation time of the solenoid valve which in turn results in shorter injection times of the fuel metering system and therefore in a higher rotary speed of the engine.

It will be understood that each of the elements described above, or two or more together, may also find a useful application in other types of constructions differing from the types described above.

While the invention has been illustrated and described as embodied in specific examples of a control device for accelerating the actuation of electromagnetic consumer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control device for increasing speed of actuation of a direct current electromagnetic consumer, particularly for use in motor vehicles, comprising terminals to a direct current power source; a capacitor; and a two-position switchover device operable for connecting, in one switching position thereof, the capacitor across the power source terminals to charge the capacitor to the full voltage of the power source and, in another switching position thereof, connecting the charged capacitor in series with the electromagnetic consumer and the terminals at such a polarity that the charge of the capacitor is added to the voltage of the power source and the increased voltage is applied to the electromagnetic consumer, the electromagnetic consumer being connected to the positive power source terminal and the negative pole of the charged capacitor being connected in the other switching position to the electromagnetic consumer and the postitive pole of the charged capacitor being connected to the ground terminal of the power source, the switchover device including a first switching contact connected between the consumer and the capacitor, a second switching contact connected between the capacitor and the ground terminal of the power source, a series connection of resistor and a diode connected between the junction points of the first switching contact and the consumer and the junction point of the capacitor and the second switching contact, and a second diode connected between the junction point of the first switching contact and the capacitor and the ground terminal of the power source.

2. A control device as defined in claim 1, comprising a switchover control circuit for simultaneously closing or opening the first and second switching contacts.

3. A control device as defined in claim 2, wherein the second switching contact is replaced by a diode.

4. A control device as defined in claim 2, further comprising a series connection of a capacitor and a resistor connected between the electromagnetic consumer and the ground terminal of the power source to act as a means for free running the electromagnetic consumer after the latter is disconnected from the capacitor.

5. A control device as defined in claim 4, wherein the electromagnetic consumer has inductance, the resistor and the capacitor acts as a means for free running the electromagnetic consumer when the first and second switching contacts are closed and, when the two switching contacts are open, energy stored in the electromagnetic consumer is transferred in the capacitor.

* * * * *